United States Patent
Sawant et al.

(10) Patent No.: US 10,110,738 B1
(45) Date of Patent: Oct. 23, 2018

(54) SYSTEMS AND METHODS FOR DETECTING ILLEGITIMATE VOICE CALLS

(71) Applicant: Symantec Corporation, Mountain View, CA (US)

(72) Inventors: Vipul Sawant, Pune (IN); Anudeep Kumar, Uttar Pradesh (IN); Debanjan Bhattacharyya, Pune (IN)

(73) Assignee: Symantec Corporation, Mountain View, CA (US)

( * ) Notice: Subject to any disclaimer, the term of this patent is extended or adjusted under 35 U.S.C. 154(b) by 117 days.

(21) Appl. No.: 15/242,308

(22) Filed: Aug. 19, 2016

(51) Int. Cl.
*H04M 3/436* (2006.01)
*H04M 3/42* (2006.01)
*G06N 3/08* (2006.01)

(52) U.S. Cl.
CPC ............ *H04M 3/436* (2013.01); *G06N 3/088* (2013.01); *H04M 3/42153* (2013.01); *H04M 3/42221* (2013.01); *H04M 2201/60* (2013.01)

(58) Field of Classification Search
CPC ........... H04M 3/2281; H04M 2201/40; H04M 2201/41; H04M 3/2218; H04M 3/38; H04M 3/42221; H04M 1/271; H04M 3/493; H04M 3/4936; H04M 15/47; H04M 2203/6027; H04M 3/385; H04M 2215/0148; H04M 3/42059; H04M 1/67; H04M 2203/558
USPC ............ 379/88.01, 88.02, 189, 88.16, 88.17, 379/88.22, 93.03, 114.14, 32.01, 85
See application file for complete search history.

(56) References Cited

U.S. PATENT DOCUMENTS

| | | | |
|---|---|---|---|
| 6,483,910 B1* | 11/2002 | Council | H04M 15/00 379/114.1 |
| 8,948,350 B2* | 2/2015 | Hodge | H04M 1/67 379/88.02 |
| 9,571,652 B1* | 2/2017 | Zeppenfeld | H04M 3/523 |
| 2007/0071206 A1* | 3/2007 | Gainsboro | H04M 3/2281 379/168 |
| 2009/0147930 A1* | 6/2009 | Rice | H04M 3/5335 379/88.12 |

(Continued)

OTHER PUBLICATIONS

TrueCaller; http://www.truecaller.com/articles/download-truecaller-mobile-app; as accessed on Aug. 11, 2016.

(Continued)

*Primary Examiner* — Akelaw Teshale
(74) *Attorney, Agent, or Firm* — FisherBroyles, LLP

(57) ABSTRACT

The disclosed computer-implemented method for detecting illegitimate voice calls may include (1) identifying an incoming voice call, (2) processing the incoming voice call in real time by (a) segmenting the incoming voice call into progressively produced call segments and, (b) for each new segment as the progressively produced call segments are produced, (A) extracting a set of features from the new segment and (B) feeding, as input into a neural network, the set of features and an output from the neural network generated based on a preceding segment of the incoming voice call, thereby generating a new output representing the current likelihood that the incoming voice call is illegitimate, (3) determining that the likelihood that the incoming voice call is illegitimate is above a predetermined threshold, and (4) performing a security action during the incoming voice call. Various other methods, systems, and computer-readable media are also disclosed.

20 Claims, 7 Drawing Sheets

(56) References Cited

U.S. PATENT DOCUMENTS

| | | | |
|---|---|---|---|
| 2009/0207987 A1* | 8/2009 | Ryan | H04M 3/2281 |
| | | | 379/188 |
| 2011/0082874 A1* | 4/2011 | Gainsboro | G06F 17/30398 |
| | | | 707/769 |
| 2013/0044867 A1* | 2/2013 | Walters | H04M 3/2281 |
| | | | 379/88.08 |
| 2013/0163737 A1* | 6/2013 | Dement | H04M 3/38 |
| | | | 379/201.01 |
| 2014/0254778 A1* | 9/2014 | Zeppenfeld | H04M 3/523 |
| | | | 379/88.02 |
| 2015/0269946 A1* | 9/2015 | Jones | G10L 17/22 |
| | | | 704/273 |
| 2015/0350438 A1* | 12/2015 | Arslan | G10L 25/63 |
| | | | 379/88.01 |
| 2015/0358459 A1* | 12/2015 | Spievak | H04M 3/436 |
| | | | 379/201.12 |
| 2017/0019534 A1* | 1/2017 | Qin | H04M 3/436 |
| 2017/0111515 A1* | 4/2017 | Bandyopadhyay | G06N 99/005 |

OTHER PUBLICATIONS

Whitepages Caller ID (now Hiya); http://hiya.com/; as accessed on Aug. 11, 2016.

Pindrop; https://www.pindrop.com/fraud-detection-system/; as accessed on Aug. 11, 2016.

Preventing Fraud in the Call Center with Phone Printing and Voice Biometrics; Published Jun. 18, 2014; http://www.forbes.com/sites/gartnergroup/2014/06/18/preventing-fraud-in-the-call-center-with-phone-printing-and-voice-biometrics/print/.

Why Phone Fraud Starts With a Silent Call; Published Aug. 24, 2015; http://www.npr.org/sections/alltechconsidered/2015/08/24/434313813/why-phone-fraud-starts-with-a-silent-call.

* cited by examiner

SYSTEMS AND METHODS FOR DETECTING ILLEGITIMATE VOICE CALLS

BACKGROUND

Telephone users are increasingly vulnerable to frauds perpetrated during phone calls. Scammers may pose as agents of trusted institutions, as officials in positions of authority, or representatives of large companies that conduct business with substantial portions of the population. Using these and other social engineering techniques, scammers may persuade their targets to provide personal information, passwords, credit card details, and so forth, paving the way for financial theft, identity theft, or even digital extortion. Unfortunately, many telephone users are unaware of or otherwise unequipped to deal with fraudulent calls. Many telephone users may be inclined to defer to practiced and authoritative sounding scammers.

Traditional approaches to address unwanted calls may both inconvenience telephone users and fail to provide adequate protection. For example, aggressive filtering of incoming calls based on whitelists may prevent telephone users from receiving legitimate—and sometimes important and expected—calls. Filtering of incoming calls based on blacklists may result in some false positives as phone numbers are recycled and may result in many false negatives as scammers quickly change or mask their phone numbers. By the time a phone number has been blacklisted, many people may have already been scammed, while many others may immediately receive calls from the same scammers under different phone numbers. In addition, some scammers have become more sophisticated, using some publicly available personal information (e.g., via social media and other Internet sources) to target their attacks, thereby reducing the call volume needed for a successful scam.

The instant disclosure, therefore, identifies and addresses a need for systems and methods for detecting illegitimate voice calls.

SUMMARY

As will be described in greater detail below, the instant disclosure describes various systems and methods for detecting illegitimate voice calls.

In one example, a computer-implemented method for detecting illegitimate voice calls may include (i) identifying, at a computing system that receives voice calls, an incoming voice call, (ii) processing the incoming voice call at the computing system in real time by (a) segmenting the incoming voice call into progressively produced call segments, and (b) for each new segment as the progressively produced call segments are produced, (A) extracting a set of features from the new segment and (B) feeding, as input into a neural network, the set of features from the new segment and an output from the neural network generated based on a preceding segment of the incoming voice call, thereby generating a new output representing a current assessment of a likelihood that the incoming voice call is illegitimate, (iii) determining that the likelihood that the incoming voice call is illegitimate is above a predetermined threshold based on output from the neural network, and (iv) performing a security action on the incoming voice call during the incoming voice call upon determining that the likelihood that the incoming voice call is illegitimate is above a predetermined threshold.

In one embodiment, the security action may include (i) alerting a user of the computing system during the incoming voice call about the likelihood that the incoming voice call is illegitimate, (ii) muting the incoming voice call, and/or (iii) terminating the incoming voice call.

In one embodiment, the neural network was trained before the incoming voice call using a group of sample voice calls and a group of legitimacy classifications applied to the sample voice calls.

In one embodiment, the set of features describes content of the incoming voice call.

In one embodiment, extracting the set of features from the new segment includes converting speech within the new segment to textual features and feeding, as input into the neural network, the set of features includes providing the textual features as input into the neural network.

In one embodiment, the set of features may include at least characteristic of background noise observed during the new segment and/or at least one non-textual speech characteristic observed during the new segment.

In one embodiment, the computing system may include a mobile phone.

In one embodiment, the computer-implemented method may further include receiving, from a user of the computing system who received the incoming voice call, a legitimacy classification of the incoming voice call and further training the neural network based on the legitimacy classification.

In one embodiment, the neural network may include a recurrent neural network.

In some examples, processing the incoming voice call at the computing system may be in response to determining that a source of the incoming voice call may include a non-trusted source.

In one embodiment, a system for implementing the above-described method may include (i) an identification module, stored in memory, that identifies, at a computing system that receives voice calls, an incoming voice call, (ii) a processing module, stored in memory, that processes the incoming voice call at the computing system in real time by (a) segmenting the incoming voice call into progressively produced call segments and, (b) for each new segment as the progressively produced call segments are produced, (A) extracting a set of features from the new segment and (B) feeding, as input into a neural network, the set of features from the new segment and an output from the neural network generated based on a preceding segment of the incoming voice call, thereby generating a new output representing a current assessment of a likelihood that the incoming voice call is illegitimate, (iii) a determination module, stored in memory, that determines that the likelihood that the incoming voice call is illegitimate is above a predetermined threshold based on output from the neural network, (iv) a performing module, stored in memory, that performs a security action on the incoming voice call during the incoming voice call upon determining that the likelihood that the incoming voice call is illegitimate is above a predetermined threshold, and (v) at least one physical processor configured to execute the identification module, the processing module, the determination module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, at a computing system that receives voice calls, an incoming voice call, (ii) process the incoming voice call at the computing system in real time by (a)

segmenting the incoming voice call into progressively produced call segments and, (b) for each new segment as the progressively produced call segments are produced, (A) extracting a set of features from the new segment and (B) feeding, as input into a neural network, the set of features from the new segment and an output from the neural network generated based on a preceding segment of the incoming voice call, thereby generating a new output representing a current assessment of a likelihood that the incoming voice call is illegitimate, (iii) determine that the likelihood that the incoming voice call is illegitimate is above a predetermined threshold based on output from the neural network, and (iv) perform a security action on the incoming voice call during the incoming voice call upon determining that the likelihood that the incoming voice call is illegitimate is above a predetermined threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
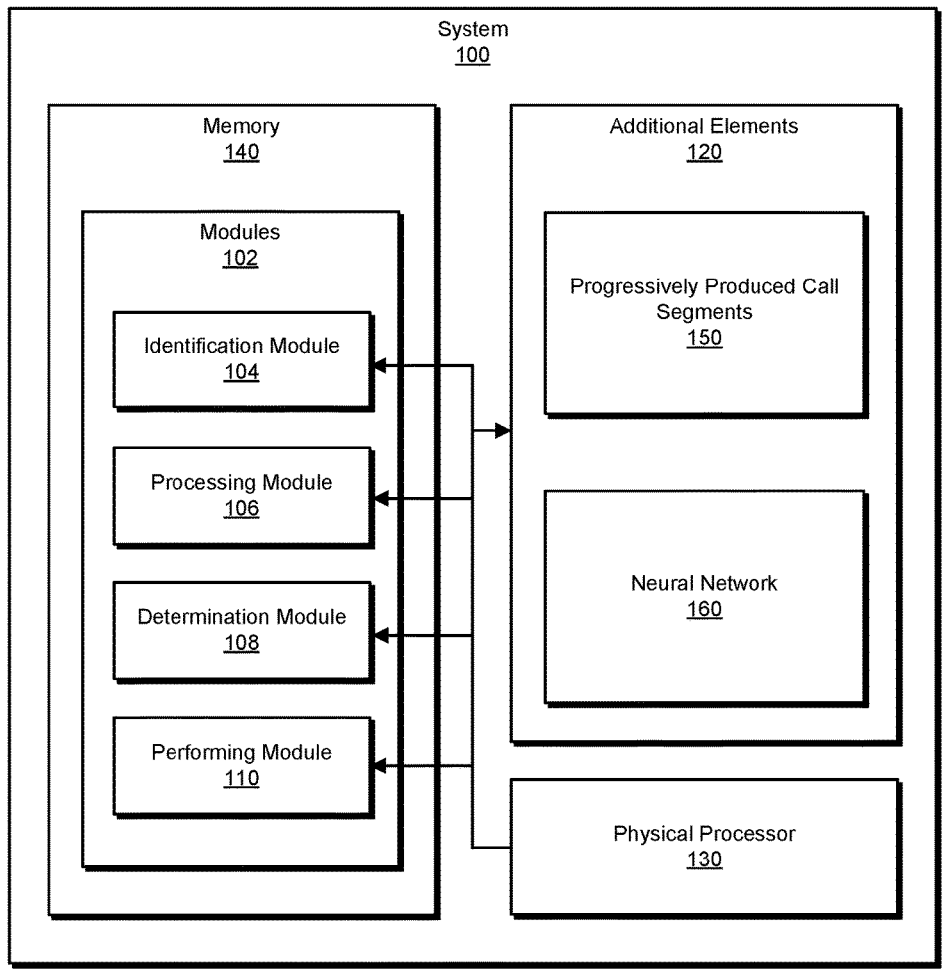
FIG. 1 is a block diagram of an example system for detecting illegitimate voice calls.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting illegitimate voice calls. As will be explained in greater detail below, by analyzing voice calls in real time, the systems and methods described herein may discover illegitimate voice calls in progress. In addition, by progressively processing and analyzing the content of voice calls using neural networks that reuse outputs as inputs in subsequent iterations (e.g., recurrent neural networks), the systems and methods described herein may discover illegitimate voice calls of arbitrary length. Furthermore, by relying on features of the content of voice calls, the systems described herein may ascertain the illegitimacy of voice calls without knowledge regarding and/or expectations about the identity of the caller. With the above advantages, the systems and methods described herein may identify illegitimate voice calls in real time with little or no specific information and/or expectations about callers, thereby preventing even adaptive illegitimate callers from performing successful social engineering attacks before action can be taken to protect call recipients during voice calls.

In addition, the systems and methods described herein may improve the functioning of a computing device by detecting illegitimate communications directed to the computing device to exploit users of the computing device. By preventing the illegitimate use of communication features of the computing device, these systems and methods may improve the security of the computing device and reduce device resources (e.g., communication resources, including but not limited to data-transmitting networks and device elements that interface with data-transmitting networks) spent on illegitimate communications. For example, the systems and methods described herein may improve the functioning of a mobile phone and/or mobile computing device (e.g., a smartphone).

Figure 2:
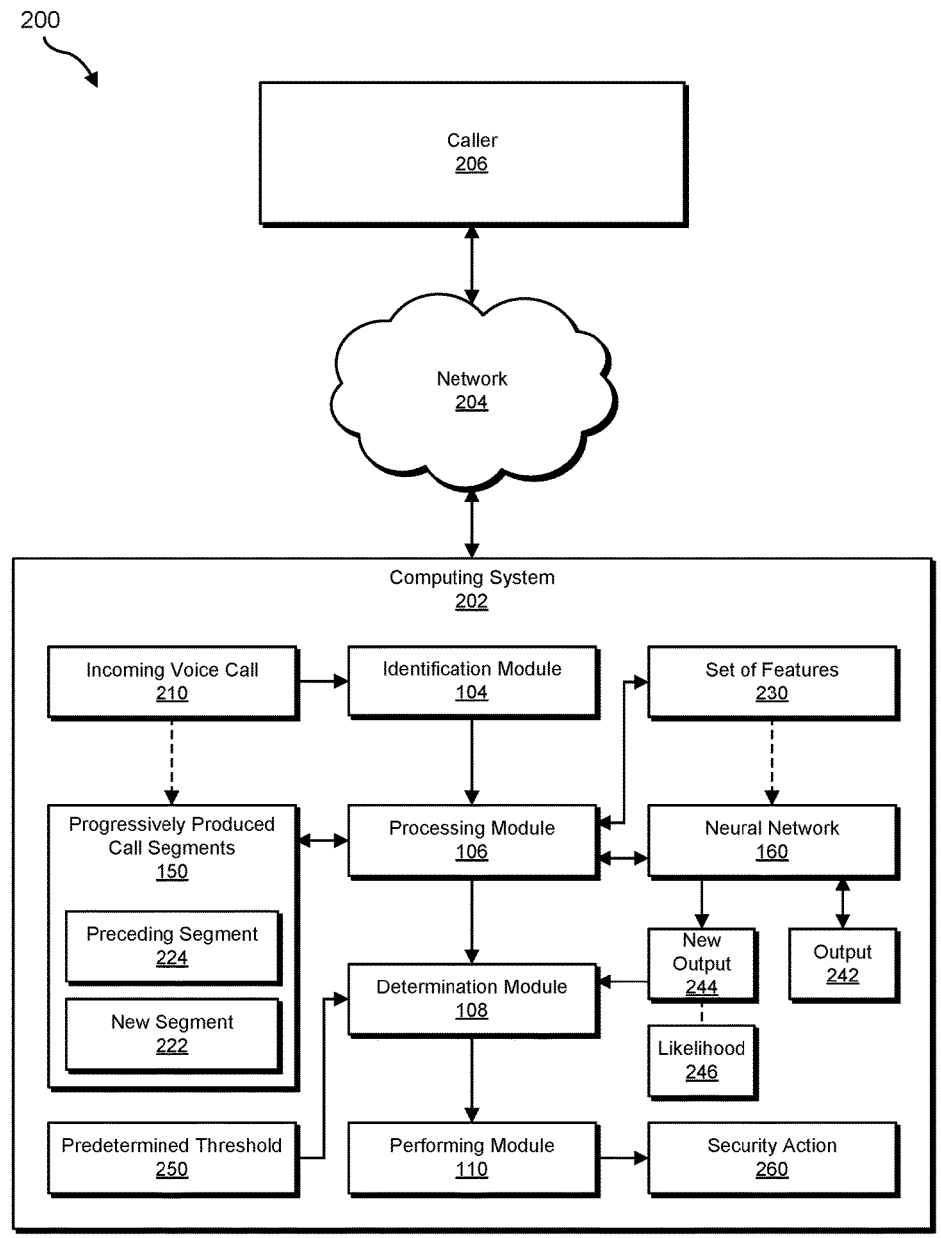
FIG. 2 is a block diagram of an additional example system for detecting illegitimate voice calls.

The following will provide, with reference to FIGS. 1-2, detailed descriptions of example systems for detecting illegitimate voice calls. Detailed descriptions of corresponding computer-implemented methods will also be provided in connection with FIG. 3. Detailed descriptions of an example voice call will be provided in connection with FIG. 4. Detailed descriptions of an example system for detecting illegitimate voice falls will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of example system 100 for detecting illegitimate voice calls. As illustrated in this figure, example system 100 may include one or more modules 102 for performing one or more tasks. For example, and as will be explained in greater detail below, example system 100 may include an identification module 104 that identifies, at a computing system that receives voice calls, an incoming voice call. Example system 100 may additionally include a processing module 106 that processes the incoming voice call at the computing system in real time by (a) segmenting the incoming voice call into progressively produced call segments and, (b) for each new segment as the progressively produced call segments are produced, (A) extracting a set of features from the new segment and (B) feeding, as input into a neural network, the set of features from the new segment and an output from the neural network generated based on a preceding segment of the incoming voice call, thereby generating a new output representing a current assessment of a likelihood that the incoming voice call is illegitimate. Example system 100 may also include a determination module 108 that determines that the likelihood that the incoming voice call is illegitimate is above a predetermined threshold based on output from the neural network. Example system 100 may additionally include a performing module 110 that performs a security action on the incoming voice call during the incoming voice call upon determining that the likelihood that the incoming voice call is illegitimate is above a predetermined threshold.

Performing module 110 may further perform a security action on the incoming voice call during the incoming voice call upon determining that the likelihood that the incoming voice call is illegitimate is above a predetermined threshold. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing system 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting illegitimate voice calls. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as progressively produced call segments 150 and a neural network 160.

Example system 100 in FIG. 1 may be implemented in a variety of ways. For example, all or a portion of example system 100 may represent portions of example system 200 in FIG. 2. As shown in FIG. 2, system 200 may include a computing system 202 in communication with a caller 206 via a network 204. In one example, all or a portion of the functionality of modules 102 may be performed by computing system 202 and/or any other suitable computing system. As will be described in greater detail below, one or more of modules 102 from FIG. 1 may, when executed by at least one processor of computing system 202, enable computing system 202 to detect illegitimate voice calls.

Computing system 202 generally represents any type or form of computing device capable of reading computer-executable instructions. For example, computing system 202 may represent a cellular phone executing communications security software. Additional examples of computing system 202 include, without limitation, laptops, tablets, desktops, servers, Personal Digital Assistants (PDAs), multimedia players, embedded systems, wearable devices (e.g., smart watches, smart glasses, etc.), Voice over Internet Protocol (VoIP) phones, gaming consoles, variations or combinations of one or more of the same, and/or any other suitable computing device.

Caller 206 generally represents any type or form of communications device (and/or a user of a communications device) that is capable of voice-based communications with computing system 202. For example, caller 206 may represent an unwanted caller (e.g., a scammer) who initiates a voice communication session with computing system 202 (e.g., using a telephone and/or a computing device capable of telecommunications) to exploit a user of computing system 202. Examples of caller 206 and/or devices used by caller 206 include, without limitation, landline-based telephones, cellular phones, Voice over Internet Protocol (VoIP) phones, laptops, tablets, desktops, servers, Personal Digital Assistants (PDAs), multimedia players, embedded systems, wearable devices (e.g., smart watches, smart glasses, etc.), gaming consoles, variations or combinations of one or more of the same, and/or any other suitable telecommunications device.

Network 204 generally represents any medium or architecture capable of facilitating communication or data transfer. In one example, network 204 may facilitate communication between computing system 202 and caller 206. In this example, network 204 may facilitate communication or data transfer using wireless and/or wired connections. Examples of network 204 include, without limitation, a cellular network (e.g., a Global System for Mobile Communications (GSM) network), a landline network, the Internet, a Wide Area Network (WAN), a Local Area Network (LAN), a Personal Area Network (PAN), Power Line Communications (PLC), an intranet, portions of one or more of the same, variations or combinations of one or more of the same, and/or any other suitable network.

Figure 3:
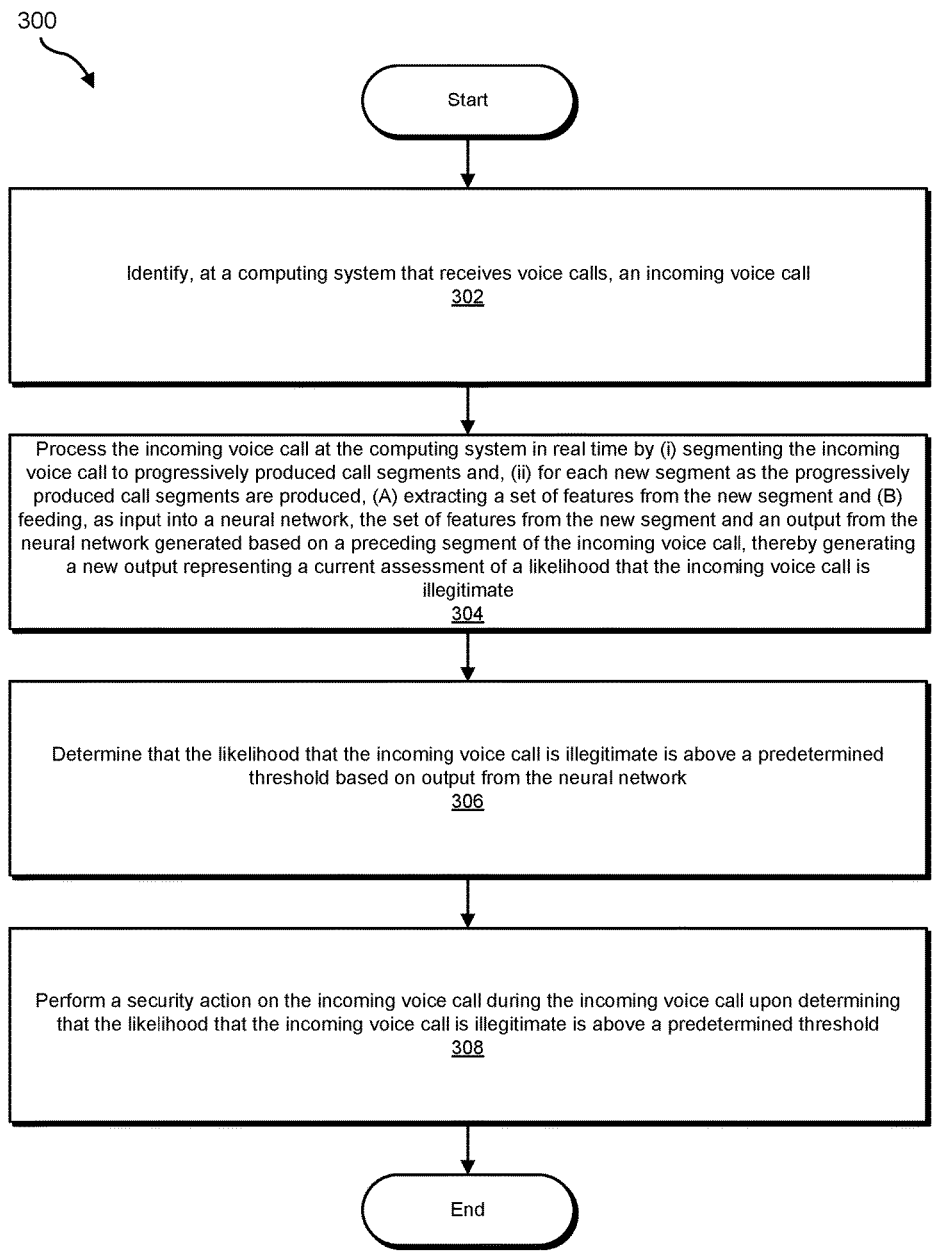
FIG. 3 is a flow diagram of an example method for detecting illegitimate voice calls.

FIG. 3 is a flow diagram of an example computer-implemented method 300 for detecting illegitimate voice calls. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify, at a computing system that receives voice calls, an incoming voice call. For example, identification module 104 may, as part of computing system 202 in FIG. 2, identify, at computing system 202 that receives voice calls, incoming voice call 210.

The term "voice call," as used herein, may refer to any type of communication session that transmits speech as sound. Examples of voice calls include telephone calls (e.g., that involve one or more telecommunications networks and/or portions of the public switched telephone network (PTSN)), VoIP calls, internet sessions with multimedia interactions (e.g., voice chat and/or video chat sessions), and/or communication sessions combining one or more of the same. In some examples, the term "voice call" may refer to a real-time, two-way speech transmission session over one or more telecommunication networks. In some examples, a voice call may be initiated by one party and accepted by another party. For example, the initiating party may supply a destination address (e.g., a telephone number, a user handle, and/or any other target identifier that identifies a device, a user, a household, and/or a subscriber) to a telecommunications device and/or client, which may send a request (e.g., a ring and/or call notification) to a call target. An owner and/or user of the destination address (e.g., target user and/or a user of a target device) may accept, decline, and/or ignore the request. In some examples, a request for a voice call may include information identifying the initiating party (e.g., a calling address, such as a telephone number and/or a user handle, from which the initiating party sends the request, a name of initiating user, etc.). Additionally or alternatively, in some examples a request for a voice call may not identify the initiating party (e.g., even when a protocol implementing the request allows for such identification).

The computing system may include any system capable of receiving, conducting, monitoring, and/or interfering with voice calls. For example, the computing system may include a mobile phone (e.g., a smartphone). In some examples, the computing system may include one or more applications for conducting voice calls. For example, a mobile phone may include a native calling application (e.g., for using native cellular network capabilities of a mobile phone) and/or one or more voice chat and/or internet telephony applications. Accordingly, identification module 104 may identify incoming voice calls for one or more of the applications for conducting voice calls. For example, identification module 104 may monitor the computing system for multiple types of voice calls received through any of a number of applications installed on a single computing system. Thus, the systems and methods described herein may provide comprehensive protection for incoming voice calls received on a single computing system.

Identification module 104 may identify the incoming voice call in any of a variety of ways. For example, identification module 104 may identify the incoming voice call by monitoring an application that receives the incoming voice call. Additionally or alternatively, identification module 104 may identify the incoming voice call via an application programming interface (API). For example, an operating system of the computing system and/or the application that receives the incoming voice call may provide information about active and/or incoming voice calls via an API. In some examples, identification module 104 may identify the incoming voice call before the voice call has been accepted and/or initiated. Additionally or alternatively, identification module 104 may identify the incoming voice call once the voice call is in progress (e.g., shortly after the incoming voice call is accepted and/or once audio is first transmitted via the voice call).

Returning to FIG. 3, at step 304, one or more of the systems described herein may process the incoming voice call at the computing system in real time by (a) segmenting the incoming voice call into progressively produced call segments and, (b) for each new segment as the progressively produced call segments are produced, (A) extracting a set of features from the new segment and (B) feeding, as input into a neural network, the set of features from the new segment and an output from the neural network generated based on a preceding segment of the incoming voice call, thereby generating a new output representing a current assessment of a likelihood that the incoming voice call is illegitimate. For example, processing module 106 may, as part of computing system 202 in FIG. 2, process incoming voice call 210 at computing system 202 in real time by (a) segmenting incoming voice call 210 into progressively produced call segments 150 and, (b) for each new segment 222 as progressively produced call segments 150 are produced, (A) extracting a set of features 230 from new segment 222 and (B) feeding, as input into neural network 160, set of features 230 from new segment 222 and output 242 from neural network 160 generated based on preceding segment 224 of incoming voice call 210, thereby generating new output 244 representing a current assessment of a likelihood 246 that incoming voice call 210 is illegitimate.

As used herein, the term "illegitimate" as it relates to voice calls may refer to calls including fraudulent communications, calls including social engineering attacks, calls including phishing attacks, calls that threaten the privacy and/or security of the recipient, and/or unwanted calls that may otherwise be difficult for a user to quickly distinguish from wanted calls.

As used herein, discussion of processing, analyzing, and/or taking action on a voice call in "real time" may refer to steps taken while the voice call is ongoing and/or updates to assessments and/or dispositions made as the voice call progresses. In some examples, steps performed in "real time" may involve a minimal delay (e.g., assessments may reflect analysis of the content of the voice call as the voice call progresses with a delay of a few seconds).

The term "call segment," as used herein, generally refers to any temporal portion of a voice call. The term "progressively produced call segments," as used herein, generally refers to a series of call segments that are identified, divided, and/or generated as a voice call progresses. For example, as will be discussed in greater detail below, processing module 106 may use any of a variety of approaches for dividing the voice call into call segments. As a voice call progresses, processing module 106 may identify new call segments in real time. Once processing module 106 identifies a most recent call segment, the voice call may continue, and processing module 106 may then identify a subsequent call segment once the subsequent portion of the voice call has met one or more criteria for designating the end of the subsequent call segment. Because processing module 106 may operate in real time, processing module 106 may make determinations of the boundaries and/or content of call segments in real time rather than retrospectively, such processing module 106 progressively produces call segments from the incoming voice call.

The term "feature," as used herein, may refer to any observable attribute of a call segment. Accordingly, the set of features of the new call segment may describe content of the incoming voice call (e.g., that is observed within the new call segment). The set of features may include any of a variety of features that may be extracted from and/or observed in a call segment. In some examples, the set of features may include speech elements. For example, the set of features may include text derived from speech within the new call segment. Additionally or alternatively, the set of features may include phonemes, parts of speech, keywords, n-grams, semantic elements, semantic graphs and/or structural features of semantic graphs, and/or ontological domains extracted from the speech. Accordingly, in one example, processing module 106 may extract the set of features from the new segment by converting speech within the new segment to textual features and may feed the textual features as input into the neural network.

In some examples, the set of features may include one or more non-textual speech characteristics observed during the new segment. For example, the set of features may include one or more characteristics of the caller's voice and/or one or more characteristics of the caller's speech patterns. For examples, the set of features may include speech volume, intonation, speed, and/or rhythm.

In some examples, the set of features may include one or more characteristics of background noise observed during the new segment. For example, the set of features may include the volume of the background noise, the consistency of the background noise, and/or elements identified in the background noise (e.g., other voices, traffic sounds, etc.).

The term "neural network," as used herein, generally refers to a machine learning method using layers of interconnected nodes. In some examples, a neural network may include an input layer of nodes, a hidden layer of nodes, and an output layer of nodes. In some examples, the term "neural network" may refer to a model and/or classifier that is generated using a neural network. In some examples, the neural network may have been trained before the incoming voice call using a plurality of sample voice calls and a plurality of legitimacy classifications applied to the plurality of sample voice calls. For example, a security service provider may have gathered a database of sample voice calls and classified the calls (e.g., as legitimate or illegitimate; as non-fraudulent or fraudulent, etc.). The security service provider may have then trained the neural network by extracting feature sets (e.g., isomorphic to the feature sets generated by the systems and methods described herein, for example, on a mobile phone during a voice call) from the sample voice calls and applying the feature sets and the classifications to the neural network to modify the neural network via supervised learning. In one embodiment, the neural network may include a recurrent neural network. For example, the recurrent neural network may use output from one step in time as input for a subsequent step in time. In this manner, the recurrent neural network may exhibit some statefulness, thereby potentially improving the ability of the neural network to analyze voice calls of unknown duration over time as the voice calls progress.

Processing module 106 may segment the incoming voice call in any of a variety of ways. For example, processing module 106 may segment the incoming voice call into segments of fixed lengths of time (e.g., 5 seconds each), identifying each segment as the segment is completed as the voice call progresses. Additionally or alternatively, processing module 106 may segment the incoming voice call based on the number of one or more observed features (e.g., segmenting based on a number of words and/or sentences observed). In some examples, processing module 106 may delineate a completed call segment and then extract features from the completed call segment. Additionally or alternatively, processing module 106 may extract features as they appear before the call segment is completed. In some examples, processing module 106 may extract some features as they appear within the call segment and extract some features from the call segment after the call segment is completed. In some examples, processing module 106 may provide the set of features as input to the neural network after extracting the entire set of features from the new segment.

Processing module 106 may process the incoming voice call in any of a variety of contexts. For example, processing module 106 may process the incoming voice call in response to determining that a source of the incoming voice call includes a non-trusted source. For example, processing module 106 may process the incoming voice call in response to determining that the identity of the caller is unknown and/or that the caller does not appear on a whitelist (e.g., a list of known legitimate callers, a contact list, etc.). Additionally or alternatively, in some examples, processing module 106 may process the incoming voice call when the incoming voice call comes from a trusted source but, instead of analyzing the incoming voice call using the neural network, may further train the neural network with the incoming voice call by classifying the incoming voice call as legitimate.

Figure 4:
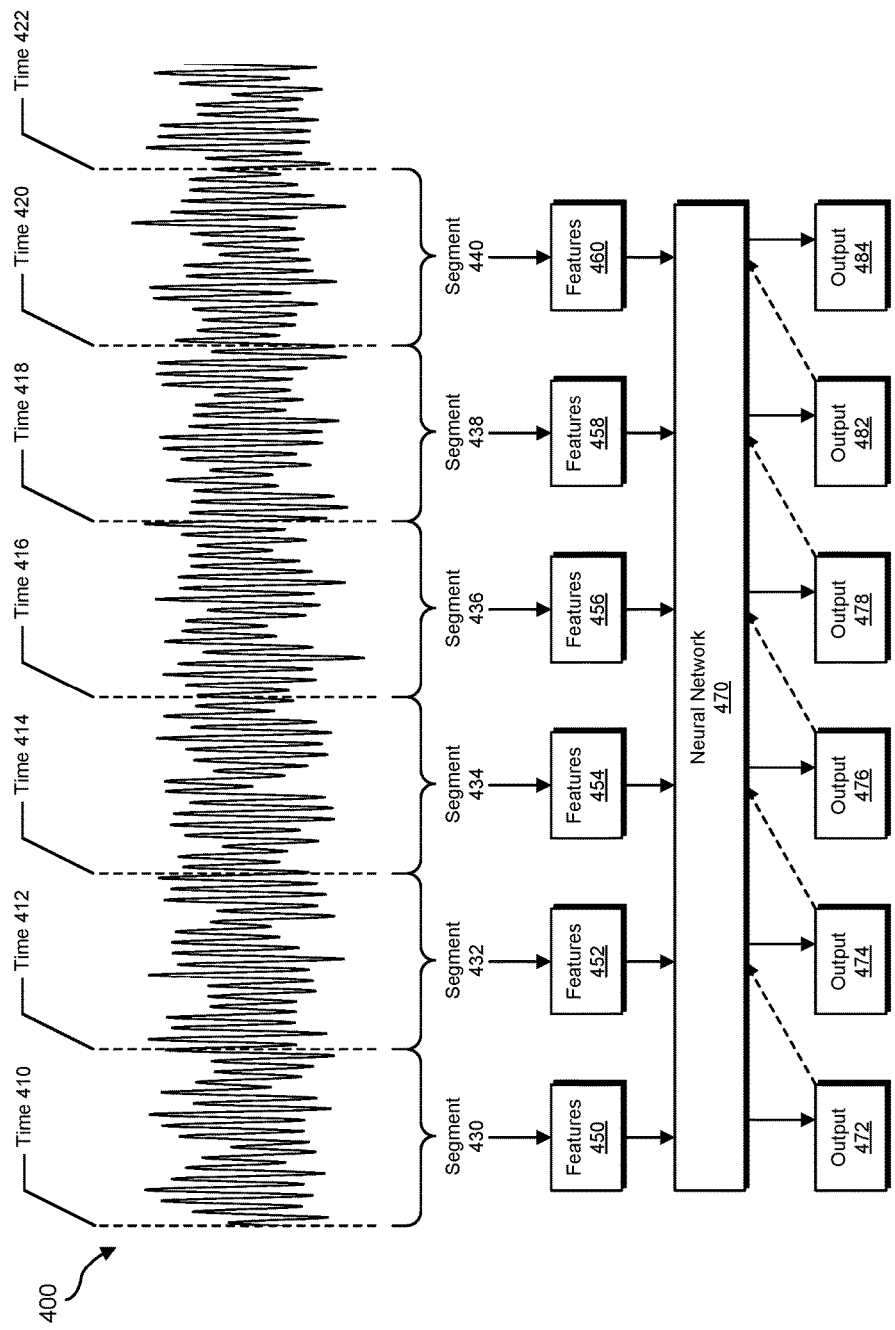
FIG. 4 is an illustration of an example voice call.

To provide an example, FIG. 4 illustrates an example voice call 400. As shown in FIG. 4, processing module 106 may divide voice call 400 into segments 430, 432, 434, 436, 438, and 440. For example, at time 412, processing module 106 may determine that segment 430 represents a complete segment of voice call 400. Processing module 106 may then extract features 450 from segment 430 and then submit features 450 as input to neural network 470 (e.g., generating output 472). Processing module 106 may then, at time 414, identify segment 432 of voice call 400, extract features 452 from segment 432, and submit features 452 as input to neural network 470 (output 472, generated after submitting features 450 to neural network 470, may also be used as input to neural network 470 in conjunction with features 452). Thus, as times 416, 418, 420, and 422 progressively pass, processing module 106 may, in turn, identify segments 434, 436, 438, and 440 and extract features 454, 456, 458, and 460, respectively, to submit as input to neural network 470.

Returning to FIG. 3, at step 306, one or more of the systems described herein may determine that the likelihood that the incoming voice call is illegitimate is above a predetermined threshold based on output from the neural network. For example, determination module 108 may, as part of computing system 202 in FIG. 2, determine that likelihood 246 that incoming voice call 210 is illegitimate is above predetermined threshold 250 based on output 242 from neural network 160.

Determination module 108 may determine that the likelihood that the incoming voice call is illegitimate is above a predetermined threshold in any suitable manner. For example, one or more nodes in the output layer of the neural network may represent a probability that the voice call is illegitimate (e.g., according to an "illegitimate" classification). In one example, one or more nodes in the output layer of the neural network may represent a probability that the voice call includes fraudulent activity (e.g., a scammer attempting to induce a target to provide private information, to transfer funds, etc.). In some examples, determining that the likelihood is above the predetermined threshold may include comparing a number value representing the likelihood with a fixed number value representing the predetermined threshold. Additionally or alternatively, determining that the likelihood is above the predetermined threshold may include the application of a more complex formula and/or decision heuristic that defines and/or constitutes the predetermined threshold.

In various examples, as will be explained in greater detail below, one or more of the systems described herein may take a security action based on the likelihood that the incoming voice call is illegitimate. In some examples, these systems may take one of multiple security actions depending on the likelihood. Accordingly, determination module 108 may compare the assessed likelihood that the incoming voice call is illegitimate with a number of thresholds corresponding to different security actions.

To provide an example using FIG. 4, determination module 108 may, in real time, determine whether the likelihood that voice call 400 is illegitimate exceeds the predetermined threshold. For example, at time 412, the systems described herein may submit features 450 to neural network 470, producing output 472. Determination module 108 may retrieve, from output 472, a probability assigned by neural network 470 that voice call 400 is illegitimate. Determination module 108 may then (e.g., before time 414) compare the assigned probability to a predetermined threshold. As, over time, the assessed probability updates (e.g., with outputs 474, 476, 478, 482, and 484 following times 414, 416, 418, 420, and 422, respectively), determination module 108 may repeat the determination with the updated assessments.

Returning to FIG. 3, at step 308, one or more of the systems described herein may perform a security action on the incoming voice call during the incoming voice call upon determining that the likelihood that the incoming voice call is illegitimate is above a predetermined threshold. For example, performing module 110 may, as part of computing system 202 in FIG. 2, perform security action 260 on incoming voice call 210 during incoming voice call 210 upon determining that likelihood 246 that incoming voice call 210 is illegitimate is above predetermined threshold 250.

The term "security action," as used herein, may refer to any action taken during a potentially illegitimate voice call to address the potential illegitimacy of the voice call. In some examples, the security action may include alerting a user of the computing system during the incoming voice call about the likelihood that the incoming voice call is illegitimate. For example, the computing system may (e.g., once the estimated likelihood is above a predetermined threshold) display the estimated likelihood that the incoming voice call is illegitimate (e.g., fraudulent). Additionally or alternatively, the computing system may display suggested instructions to the user (e.g., to terminate the call, to avoid providing certain types of personal information and/or to avoid taking certain types of actions, such as money transfers). In some examples, the computing system may alert the user with a warning sound and/or audible warning message played over the call. Additionally or alternatively, performing module 110 may provide tactile feedback to the user (e.g., vibrations via the computing system) to warn the user and/or induce the user to look at a visual warning displayed on the computing system.

In some examples, the security action may include muting the incoming voice call. For example, the security action may include muting the voice call so that the user of the computing system can no longer hear the initiator of the voice call and/or so that the initiator of the voice call can no longer hear the user of the computing system. In some examples, the security action may include playing audio indicating that the call has been placed on hold (e.g., playing the audio to the initiator of the voice call). In some examples, the security action may mute the voice call until the user provides input acknowledging a warning that the voice call is potentially illegitimate.

In some examples, the security action may include terminating the voice call. Additionally or alternatively, the security action may include reporting information about the voice call (e.g., the source of the voice call, the target of the voice call, the time of the voice call, the length of the voice call, and/or a transcript of the voice call) to a security vendor.

In some examples, performing module 110 may receive, from a user of the computing system who received the incoming voice call, a legitimacy classification of the incoming voice call and further train the neural network based on the legitimacy classification. For example, performing module 110 may alert the user that the incoming voice call is potentially illegitimate. In addition, performing module 110 may, during the voice call and/or after the voice call, provide one or more input elements to allow the user to indicate whether the voice call was legitimate, whether the voice call was unsolicited, whether the voice call included any apparent attempts at fraud in the judgment of the user, whether the initiator of the voice call requested that the user provide certain types of personal information (e.g., passwords, social security numbers, credit card numbers, Personal Identification Numbers (PINS), etc.), whether the initiator of the voice call requested that the user transfer funds, whether the initiator of the voice call requested that the user visit an Internet site, download a file, and/or install an application, etc. Performing module 110 may use the input provided by the user to classify the voice call and further train the neural network based on the classifier.

Performing module 110 may perform the security action in any suitable manner. For example, performing module 110 may perform the security action during the voice call, e.g., immediately upon determining that the probability that the voice call is illegitimate crosses a predetermined threshold. In some examples, as described above, performing module 110 may interfere with the voice call in progress. For example, performing module 110 may communicate with a calling application that conducts the voice call and/or with an operating system on the computing system to display messages, sound alerts, provide tactical feedback, interrupt audio, and/or drop the call during the voice call.

Figure 5:
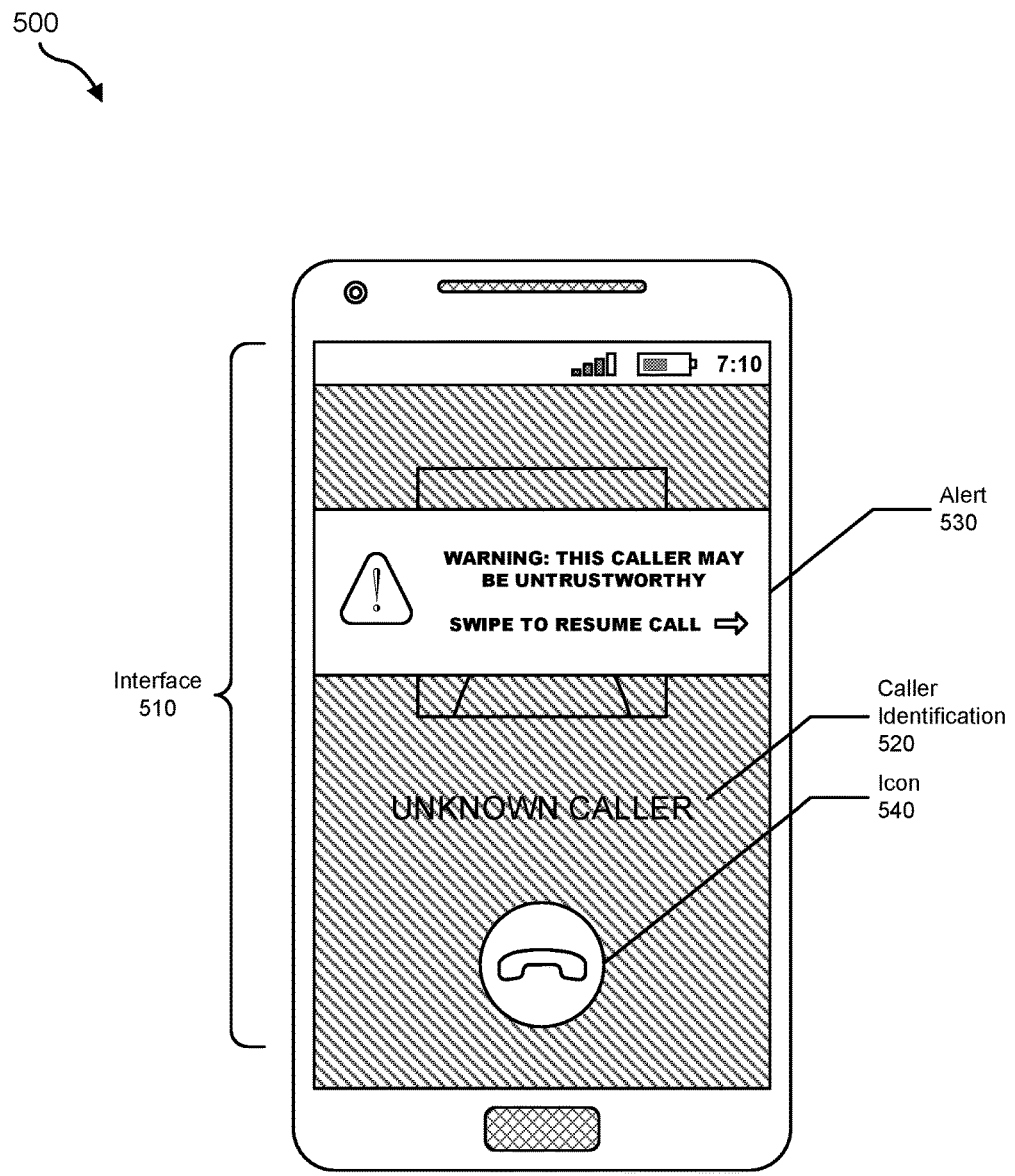
FIG. 5 is an illustration of an example system for detecting illegitimate voice calls.

To provide an example of a security action, FIG. 5 illustrates an example system 500. As shown in FIG. 5, system 500 may include an interface 510. System 500 may, within interface 510, display a caller identification 520, an alert 530, and an icon 540. For example, during a voice call, caller identification 520 and icon 540 may display. However, during the voice call, systems described herein may determine that the voice call is illegitimate, and display an alert 530 over the ordinary call interface elements in interface 510. In this example, alert 530 may alert the user that the caller is untrustworthy in conjunction with placing the call on hold. Accordingly, alert 530 may also include an interface element for resuming the call. In addition, in some examples, while other interface elements may be obscured, greyed out, darkened, and/or hidden by alert 530, icon 540 (e.g., allowing a user to disconnect the call) may remain visible and prominent (e.g., to allow and/or encourage the user to disconnect the call upon observing alert 530). In some examples, alert 530 may have been accompanied by additional alerting elements (e.g., an audible alert, a tactile alert via phone vibration, etc.) to induce the user to see alert 530.

As explained above in connection with example method 300 in FIG. 3, scammers may call cell phone users, pretending to be a bank representative, a government official, or another legitimate company or body. Scammers may attempt to persuade the cell phone user to divulge personal details, passwords, credit card details, Automatic Teller Machine (ATM) PINs, etc. In some cases, the content of a legitimate call may be similar to the content of an illegitimate call, excepting subtle differences whereby the scammer may attempt to persuade the cell phone user to divulge certain information where a legitimate caller would not. Accordingly, the systems and methods described herein may detect scam calls and alert a user in real time with a fraudulence metric that indicates the chance of the call being a fraudulent call. These systems and methods may also facilitate continuous learning and refinement of the prediction models based on user input. Thus, these systems and methods may include an unsolicited and/or scam call identifier that considers speech content, noise, and voice attributes and works in real time in an ongoing call. In addition, such an identifier may constantly refine itself based on user preferences and input.

In one example, the systems and methods described herein may detect fraudulent calls by converting speech to text in real time while constantly recording textual features using a pre-trained machine learning model to predict every few seconds the fraudulence of a call. For example, systems and methods described herein may (a) gather and/or create a large database of both legitimate and fraudulent calls, (b) perform speech-to-text processing to convert the calls into text, (c) record background noise information and other speech-related features such as average pause between words, pitch, loudness, etc., (d) label each call with periodic fraudulence assessments as the call progresses (e.g., providing a percentage value representing the apparent fraudulence after every four sentences or after every 30 seconds), use natural language processing, parts-of-speech tagging, ontology, semantic graphics, etc., to create features from the text using n-grams, different parts-of-speech words, relationships, important words, etc., (f) create training data using voice and noise related features, text features, and fraudulence classifications, (g) train recurrent neural networks on the training data, considering each sample as a sequence of events and/or features showing a dynamic temporal behavior (the recurrent neural networks may deal with sequential data and have a continuously updated memory along with the current state, which may be used to provide a prediction/probability of an event at a point in time), (h) use the trained neural network on a user's cell phone as an application that may listen to a call, convert it to speech in real time, transform the speech to the feature space used by the neural network, and output a fraudulence assessment every few seconds (the application may also allow the user to configure the application to alert the user and/or drop the call when the fraudulence assessment is sufficiently high), (i) take input from the user on the fraudulence, save the input, and retrain the model off-line using the input.

In some examples, scammers may call the same person using a different assumed identity and from a different phone number. The systems and methods described herein may effectively detect such calls by leveraging both textual information and information about the voice of the caller and the background noise of the caller. In some examples, the systems and methods described herein may not require information about the caller in advance. These systems and methods may be effective in detecting scam calls whether the calls originate from a bulk spammer or a targeted attacker.

In some examples, pre-trained models for classifying calls may be available in a central repository. When an application for detecting illegitimate calls is installed on a user's phone, the application may download a pre-trained model. The application may also download, locate, and/or come equipped with a speech-to-text converter, a voice analyzer, a sound analyzer, and/or a feature transformation engine. The application may provide an interface for the user to configure the application to provide phone number filters (e.g., such that the application is not triggered when a call comes from a number in the user's contact list). The application may also allow the user the configure the assessed fraudulence thresholds at which one or more actions are taken (e.g., disconnecting, playing a sound, muting, etc.). Upon identifying a call, the application may start monitoring the conversation. The application may activate the speech-to-text converter, the voice analyzer, and/or the sound analyzer. These components may extract raw features, while the feature transformation engine may produce features in a form consumable by the model. The model may produce a fraudulence assessment every few seconds (e.g., as configured). The application may take actions as configured if the fraudulence assessment crosses a configured threshold. Once a call being monitored finishes, the application may query the user about the fraudulence of the call. The user's input in response may be uploaded to the central repository. Pre-trained models may be retrained using the user's input (e.g., globally by retraining repository-stored models and/or individually by retraining an instance of the model specific to the user and/or to a group to which the user belongs). Once a new model is generated the application may update the model by downloading the new version from the central repository.

Figure 6:
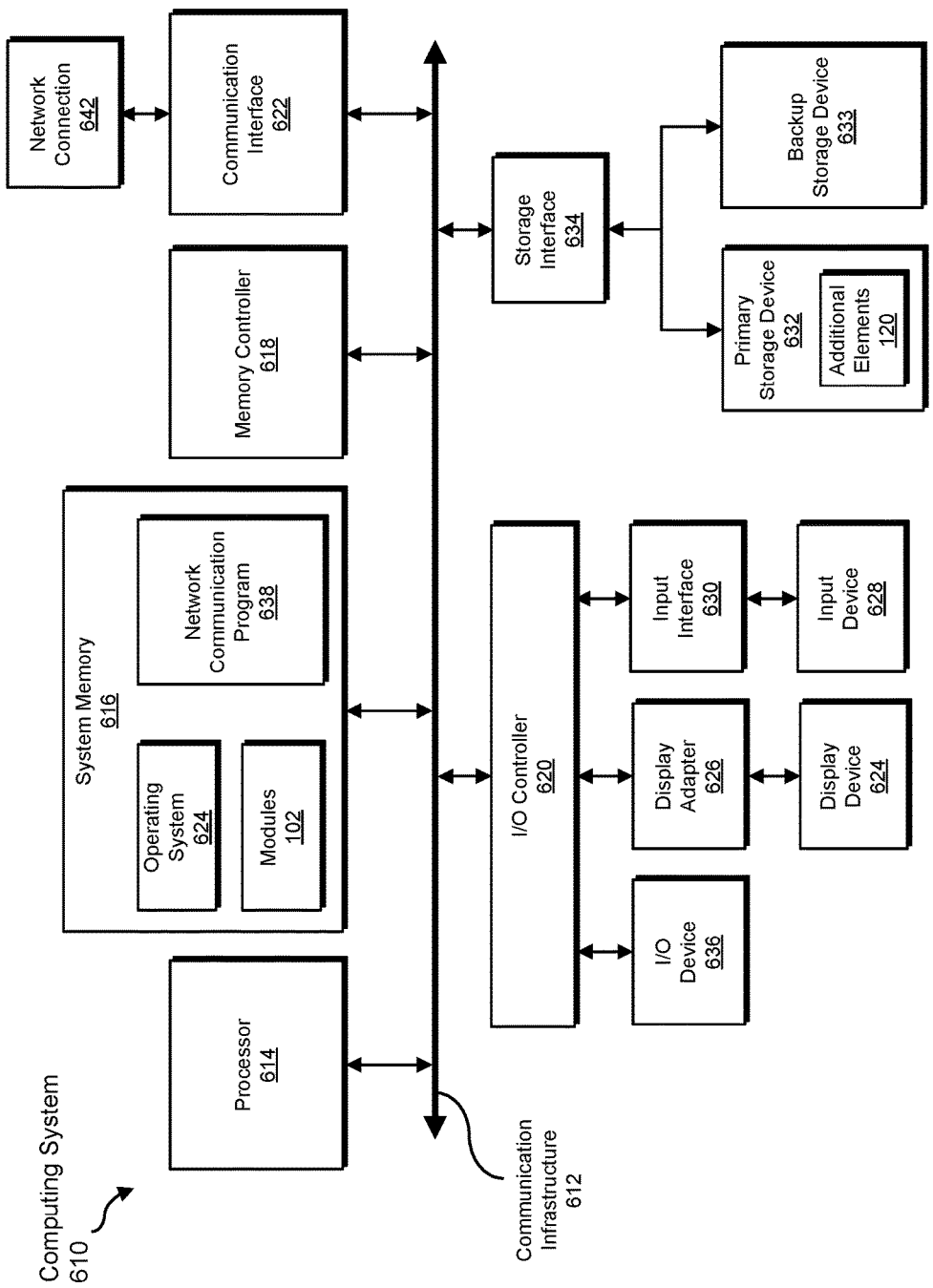
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
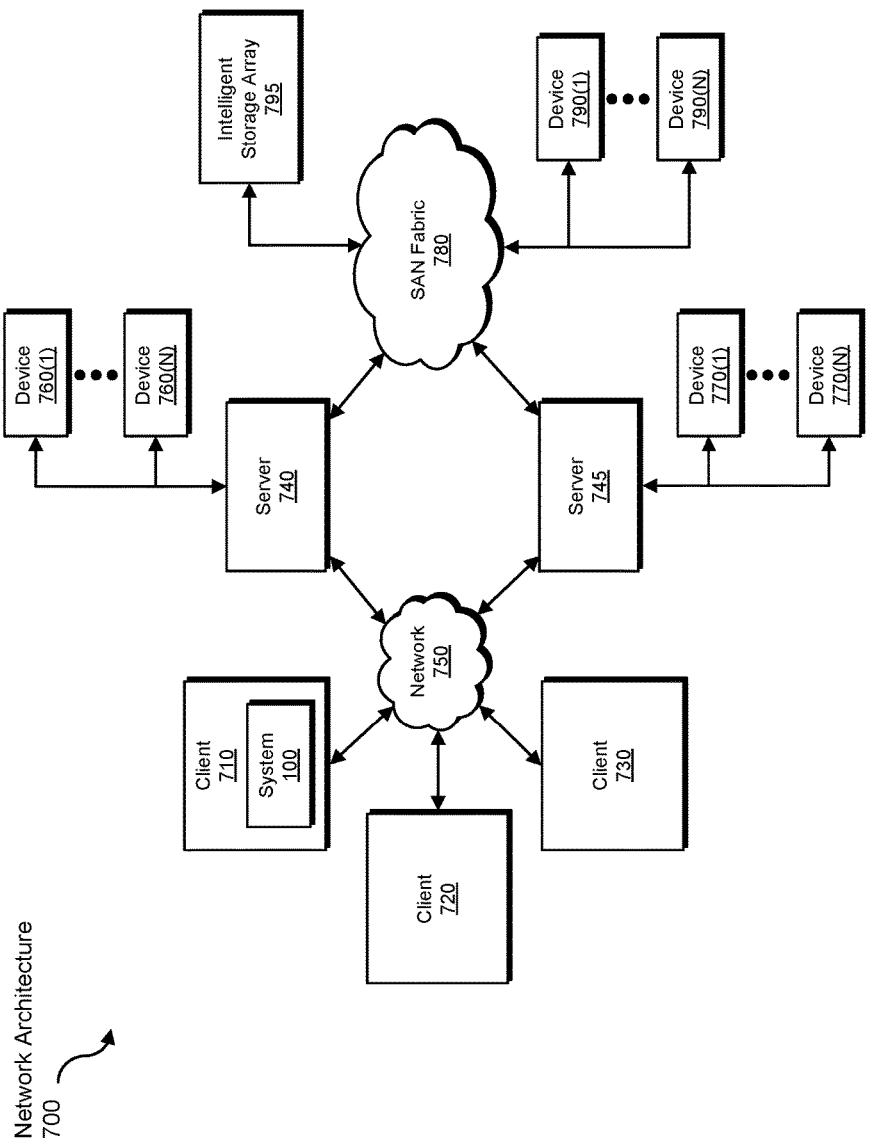
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting illegitimate voice calls.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive an audio stream of a voice call to be transformed, transform the audio stream, output a result of the transformation to a neural network, use the result of the transformation to classify the voice call, and store a result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting illegitimate voice calls, at least a portion of the method being performed by a computing device comprising at least one processor, the method comprising:
    identifying, at a computing system that receives voice calls, an incoming voice call;
    processing the incoming voice call at the computing system in real time by:
        segmenting the incoming voice call into progressively produced call segments; and
        for each new segment as the progressively produced call segments are produced:
            extracting a set of features from the new segment; and
            feeding, as input into a neural network, the set of features from the new segment and an output from the neural network generated based on a preceding segment of the incoming voice call, thereby generating a new output representing a current assessment of a likelihood that the incoming voice call is illegitimate;
    determining that the likelihood that the incoming voice call is illegitimate is above a predetermined threshold based on output from the neural network; and
    performing a security action on the incoming voice call during the incoming voice call upon determining that the likelihood that the incoming voice call is illegitimate is above a predetermined threshold.

2. The computer-implemented method of claim 1, wherein the security action comprises at least one of:
    alerting a user of the computing system during the incoming voice call about the likelihood that the incoming voice call is illegitimate;
    muting the incoming voice call; and
    terminating the incoming voice call.

3. The computer-implemented method of claim 1, wherein the neural network was trained before the incoming voice call using a plurality of sample voice calls and a plurality of legitimacy classifications applied to the plurality of sample voice calls.

4. The computer-implemented method of claim 1, wherein the set of features describes content of the incoming voice call.

5. The computer-implemented method of claim 1, wherein:
    extracting the set of features from the new segment comprises converting speech within the new segment to textual features; and
    feeding, as input into the neural network, the set of features comprises providing the textual features as input into the neural network.

6. The computer-implemented method of claim 1, wherein the set of features comprises at least one of:
    at least characteristic of background noise observed during the new segment; and
    at least one non-textual speech characteristic observed during the new segment.

7. The computer-implemented method of claim 1, wherein the computing system comprises a mobile phone.

8. The computer-implemented method of claim 1, further comprising:
    receiving, from a user of the computing system who received the incoming voice call, a legitimacy classification of the incoming voice call; and
    further training the neural network based on the legitimacy classification.

9. The computer-implemented method of claim 1, wherein the neural network comprises a recurrent neural network.

10. The computer-implemented method of claim 1, wherein processing the incoming voice call at the computing system is in response to determining that a source of the incoming voice call comprises a non-trusted source.

11. A system for detecting illegitimate voice calls, the system comprising:
    an identification module, stored in memory, that identifies, at a computing system that receives voice calls, an incoming voice call;

a processing module, stored in memory, that processes the incoming voice call at the computing system in real time by:
  segmenting the incoming voice call into progressively produced call segments; and
  for each new segment as the progressively produced call segments are produced:
    extracting a set of features from the new segment; and
    feeding, as input into a neural network, the set of features from the new segment and an output from the neural network generated based on a preceding segment of the incoming voice call, thereby generating a new output representing a current assessment of a likelihood that the incoming voice call is illegitimate;
a determination module, stored in memory, that determines that the likelihood that the incoming voice call is illegitimate is above a predetermined threshold based on output from the neural network;
a performing module, stored in memory, that performs a security action on the incoming voice call during the incoming voice call upon determining that the likelihood that the incoming voice call is illegitimate is above a predetermined threshold; and
at least one physical processor configured to execute the identification module, the processing module, the determination module, and the performing module.

12. The system of claim 11, wherein the security action comprises at least one of:
  alerting a user of the computing system during the incoming voice call about the likelihood that the incoming voice call is illegitimate;
  muting the incoming voice call; and
  terminating the incoming voice call.

13. The system of claim 11, wherein the neural network was trained before the incoming voice call using a plurality of sample voice calls and a plurality of legitimacy classifications applied to the plurality of sample voice calls.

14. The system of claim 11, wherein the set of features describes content of the incoming voice call.

15. The system of claim 11, wherein:
  the processing module extracts the set of features from the new segment by converting speech within the new segment to textual features; and
  the processing module feeds, as input into the neural network, the set of features by providing the textual features as input into the neural network.

16. The system of claim 11, wherein the set of features comprises at least one of:
  at least characteristic of background noise observed during the new segment; and
  at least one non-textual speech characteristic observed during the new segment.

17. The system of claim 11, wherein the computing system comprises a mobile phone.

18. The system of claim 11, wherein the performing module further:
  receives, from a user of the computing system who received the incoming voice call, a legitimacy classification of the incoming voice call; and
  trains the neural network further based on the legitimacy classification.

19. The system of claim 11, wherein the neural network comprises a recurrent neural network.

20. A non-transitory computer-readable medium comprising one or more computer-readable instructions that, when executed by at least one processor of a computing device, cause the computing device to:
  identify, at a computing system that receives voice calls, an incoming voice call;
  process the incoming voice call at the computing system in real time by:
    segmenting the incoming voice call into progressively produced call segments; and
    for each new segment as the progressively produced call segments are produced:
      extracting a set of features from the new segment; and
      feeding, as input into a neural network, the set of features from the new segment and an output from the neural network generated based on a preceding segment of the incoming voice call, thereby generating a new output representing a current assessment of a likelihood that the incoming voice call is illegitimate;
  determine that the likelihood that the incoming voice call is illegitimate is above a predetermined threshold based on output from the neural network; and
  perform a security action on the incoming voice call during the incoming voice call upon determining that the likelihood that the incoming voice call is illegitimate is above a predetermined threshold.

* * * * *